US008702492B2

(12) United States Patent
Walker et al.

(10) Patent No.: US 8,702,492 B2
(45) Date of Patent: Apr. 22, 2014

(54) METHODS AND APPARATUS FOR EMPLOYING AUDIO/VIDEO PROGRAMMING TO INITIATE GAME PLAY AT A GAMING DEVICE

(75) Inventors: Jay S. Walker, Ridgefield, CT (US); Stephen C. Tulley, Fairfield, CT (US); James A. Jorasch, Stamford, CT (US); David F. Zucker, Winnetka, IL (US)

(73) Assignee: IGT, Las Vegas, NV (US)

( * ) Notice: Subject to any disclaimer, the term of this patent is extended or adjusted under 35 U.S.C. 154(b) by 1581 days.

(21) Appl. No.: 10/417,733

(22) Filed: Apr. 16, 2003

(65) Prior Publication Data

US 2003/0211881 A1 Nov. 13, 2003

Related U.S. Application Data

(60) Provisional application No. 60/373,112, filed on Apr. 16, 2002.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .................................. 463/20; 463/16; 463/40

(58) Field of Classification Search
USPC ........................................................ 463/1–69
See application file for complete search history.

(56) References Cited

U.S. PATENT DOCUMENTS

| | | | | |
|---|---|---|---|---|
| 4,621,814 | A | 11/1986 | Stepan et al. | 273/138 A |
| 4,926,327 | A | 5/1990 | Sidley | 364/412 |
| 5,237,157 | A | 8/1993 | Kaplan | 235/375 |
| 5,259,613 | A | 11/1993 | Marnell, II | 273/138 A |
| 5,429,361 | A | 7/1995 | Raven et al. | 273/138 A |
| 5,488,411 | A | 1/1996 | Lewis | 348/8 |
| 5,530,852 | A | 6/1996 | Meske, Jr. et al. | 395/600 |
| 5,550,561 | A | 8/1996 | Ziarno | 345/163 |
| 5,590,197 | A | 12/1996 | Chen et al. | 380/24 |

(Continued)

FOREIGN PATENT DOCUMENTS

| | | |
|---|---|---|
| WO | WO 95/30944 | 11/1995 |
| WO | WO 00/32286 | 6/2000 |

(Continued)

OTHER PUBLICATIONS

Beyer, Andrew, "Tracks Without Horses; Teletrack Has Drawbacks; Opening Day at Teletrack", The Washington Post, Oct. 25, 1979, Section: Sports, Fl.
Milbert, Neil, "Win, Place, Showtime Teletrack Theatre is a Hit in Connecticut", Chicago Tribune, Jun. 26, 1987, Section: Sports, p. 1, Zone: C.
"Strategy Analytics: Enhanced TV and Interactive Games to Dominate $1.8 Billion Interactive TV Market; 72 Million Europeans Have Access to Interactive TV", Business Wire, Sep. 10, 2002.

(Continued)

*Primary Examiner* — Arthur O Hall
*Assistant Examiner* — Wei Lee
(74) *Attorney, Agent, or Firm* — Neal, Gerber & Eisenberg LLP

(57) ABSTRACT

In a first aspect, a method of operating a gaming device is provided. The method includes the steps of (1) receiving an indication of an occurrence of a game initiation trigger associated with audio/video programming being provided to a player of the gaming device; and (2) in response to the occurrence of the game initiation trigger, initiating game play at the gaming device. The audio/video programming may comprise, for example, a television show, a movie, an animated show, a live event, or the like. Numerous other aspects are provided.

39 Claims, 10 Drawing Sheets

(56) References Cited

U.S. PATENT DOCUMENTS

| | | | | |
|---|---|---|---|---|
| 5,592,212 | A | 1/1997 | Handelman | 348/12 |
| 5,592,375 | A | 1/1997 | Salmon et al. | 395/207 |
| 5,594,661 | A | 1/1997 | Bruner et al. | 364/514 R |
| 5,638,426 | A | 6/1997 | Lewis | 379/90 |
| 5,646,988 | A | 7/1997 | Hikawa | 379/266 |
| 5,675,828 | A | 10/1997 | Stoel et al. | 395/825 |
| 5,752,882 | A | 5/1998 | Acres et al. | 463/42 |
| 5,761,647 | A | 6/1998 | Boushy | 705/10 |
| 5,823,872 | A | 10/1998 | Prather et al. | 463/6 |
| 5,839,960 | A | 11/1998 | Parra et al. | 463/41 |
| 5,935,002 | A | 8/1999 | Falciglia | 463/19 |
| 5,971,271 | A | 10/1999 | Wynn et al. | 235/380 |
| 5,997,400 | A | 12/1999 | Seelig et al. | 463/6 |
| 6,033,307 | A | 3/2000 | Vancura | |
| 6,080,063 | A * | 6/2000 | Khosla | 463/42 |
| 6,095,921 | A | 8/2000 | Walker et al. | 463/20 |
| 6,113,495 | A | 9/2000 | Walker et al. | 463/42 |
| 6,135,884 | A | 10/2000 | Hedrick et al. | |
| 6,135,885 | A | 10/2000 | Lermusiaux | |
| 6,139,431 | A | 10/2000 | Walker et al. | 463/20 |
| 6,146,276 | A * | 11/2000 | Okuniewicz | 463/35 |
| 6,155,925 | A | 12/2000 | Giobbi et al. | |
| 6,186,893 | B1 | 2/2001 | Walker et al. | 463/20 |
| 6,190,256 | B1 | 2/2001 | Walker et al. | 463/25 |
| 6,193,610 | B1 * | 2/2001 | Junkin | 463/40 |
| 6,203,429 | B1 * | 3/2001 | Demar et al. | 463/20 |
| 6,210,275 | B1 | 4/2001 | Olsen | 463/16 |
| 6,231,442 | B1 | 5/2001 | Mayeroff | |
| 6,234,896 | B1 | 5/2001 | Walker et al. | 463/16 |
| 6,270,411 | B1 | 8/2001 | Gura et al. | |
| 6,287,194 | B1 | 9/2001 | Okada et al. | |
| 6,302,790 | B1 | 10/2001 | Brossard | 463/20 |
| 6,309,299 | B1 | 10/2001 | Weiss | |
| 6,309,301 | B1 * | 10/2001 | Sano | 463/35 |
| 6,319,123 | B1 | 11/2001 | Paludi | 463/20 |
| 6,375,568 | B1 | 4/2002 | Roffman et al. | 463/26 |
| 6,375,570 | B1 | 4/2002 | Poole | 463/31 |
| 6,390,917 | B1 | 5/2002 | Walker et al. | 463/20 |
| 6,406,369 | B1 | 6/2002 | Baerlocher et al. | |
| 6,447,396 | B1 * | 9/2002 | Galyean et al. | 463/40 |
| 6,464,581 | B1 * | 10/2002 | Yoseloff et al. | 463/20 |
| 6,500,068 | B2 | 12/2002 | Walker et al. | 463/25 |
| 6,554,703 | B1 | 4/2003 | Bussick et al. | |
| 6,582,310 | B1 | 6/2003 | Walker et al. | |
| 6,612,574 | B1 | 9/2003 | Cole et al. | |
| 6,656,046 | B1 * | 12/2003 | Yoseloff et al. | 463/20 |
| 6,780,105 | B1 * | 8/2004 | Kaminkow | 463/16 |
| 6,786,824 | B2 | 9/2004 | Cannon | |
| 6,801,261 | B1 * | 10/2004 | Haynes | 348/553 |
| 6,884,165 | B2 | 4/2005 | Baerlocher | |
| 6,970,859 | B1 | 11/2005 | Brechner et al. | 707/3 |
| 6,984,174 | B2 * | 1/2006 | Cannon et al. | 463/25 |
| 7,351,146 | B2 | 4/2008 | Kaminkow | |
| 2001/0003099 | A1 * | 6/2001 | Von Kohorn | 463/40 |
| 2001/0024971 | A1 | 9/2001 | Brossard | |
| 2001/0024974 | A1 * | 9/2001 | Cohen | 463/42 |
| 2001/0049298 | A1 | 12/2001 | Bennett | |
| 2002/0016201 | A1 | 2/2002 | Bennett et al. | |
| 2002/0034980 | A1 * | 3/2002 | Lemmons et al. | 463/40 |
| 2002/0039919 | A1 | 4/2002 | Joshi et al. | |
| 2002/0170068 | A1 | 11/2002 | Rafey et al. | |
| 2003/0060275 | A1 | 3/2003 | Hughs-Baird | |
| 2003/0066089 | A1 * | 4/2003 | Andersen | 725/112 |
| 2003/0069057 | A1 * | 4/2003 | DeFrees-Parrott | 463/16 |
| 2003/0078091 | A1 | 4/2003 | Brandstetter et al. | |
| 2003/0114053 | A1 | 6/2003 | Hahn et al. | |
| 2005/0071023 | A1 | 3/2005 | Gilliland et al. | |
| 2005/0096121 | A1 | 5/2005 | Gilliland et al. | |
| 2005/0096125 | A1 | 5/2005 | LeMay | |

FOREIGN PATENT DOCUMENTS

| | | |
|---|---|---|
| WO | WO 01/15450 | 3/2001 |
| WO | WO 0115450 A1 * | 3/2001 |
| WO | WO 02/24288 | 3/2002 |

OTHER PUBLICATIONS

Office Action U.S. Appl. No. 10/417,758, filed Apr. 16, 2003 9 Pages.
Office Action U.S. Appl. No. 10/417,758, filed Apr. 16, 2003 12 Pages.
Office Action U.S. Appl. No. 10/417,758, filed Apr. 16, 2003 13 Pages.
Office Action U.S. Appl. No. 10/417,758, filed Apr. 16, 2003 10 Pages.
Office Action U.S. Appl. No. 10/417,758, filed Apr. 16, 2003 8 Pages.
Shah, Rawn, "Suggestions for Information Kiosk Systems using the World Wide Web", The World Wide Web Information Kiosks Special Interest Group, Apr. 30, 1994.
Christiansen, Eugene Martin, "Gaming and entertainment—an imperfect union?", Cornell Hotel & Restaurant Administration Quarterly, Apr. 1995, Section: vol. 36, No. 2, p. 79, ISSN: 0010-8804.
"Takasago Denki to offer Video-On-Demand Game Machines", COMLINE Daily News Computers, Apr. 4, 1995.
Schafer, Sarah, "Street Cruising", Technology Inc., 1996, No. 2, p. 19, Ref. No. 16960191.
Roger, Dennis, "tpNet ready to help in the hunt for NZ products", The Press, Jul. 23, 1996, Section: Features, Computers, p. 24, Computers & Business Technology.
Evenson, Laura, "Back in the Game Nolan Bushnell, creator of Atari and 'Pong' has come up with TeamNet and TouchN", The San Francisco Chronicle, Aug. 23, 1996, Section: Daily Datebook, p. Dl.
Miller, Donald, "Terminal is set up for public use", Santa Cruz Sentinel, Sep. 29, 1996, Section: p. D1.
Denton, Nicholas, "British Telcom launches public online booths", The Financial Post, Oct. 29, 1996, Section: Section 1, News, p. 10.
"Internet pub scorns the café 'anoraks'", The Herald, Dec. 2, 1996, Section: p. 4.
Bueschel, Richard, "The Encyclopedia of Pinball vol. 1", Jan. 1997.
Price, Stuart, "Connected: Kiosks get off to a slow start Technology BT's touch-screen information points have to clear a cultural hurdle", The Daily Telegraph, Feb. 4, 1997, Section p. 06.
Website: "Net Access Inc. Home Page", (http www netaccessinc com/index htm), download date: Feb. 27, 1997.
Website: "The Public Access Coin Operated Internet Browser", (http //embed com: 80/coinet htm), download date: Feb. 27, 1997.
"The Internet Goes Mainstream", RePlay Magazine, Mar. 1997, pp. 179-183.
U.S. Examiner's Office Action dated Mar. 31, 2006, U.S. Appl. No. 10/395,529, filed Mar. 21, 2003 10 pages.
U.S. Examiner's Notice of Allowability dated Nov. 14, 2006, U.S. Appl. No. 10/395,529, filed Mar. 21, 2003 3 pages.
Tang, Nelson, "The Original Friends Drinking Game," Jan. 2, 1996, available at <http://web.archive.org/web/19991008145735/friends-cafe.hypermart.net/drinkinggame/original.html> (3 pages).
Office Action dated Dec. 10, 2007 for U.S. Appl. No. 11/428,441. (14 pages).
Office Action dated Aug. 19, 2008 for U.S. Appl. No. 11/428,441. (14 pages).
Office Action dated Dec. 10, 2007 for U.S. Appl. No. 11/428,443. (8 pages).
Office Action dated Aug. 18, 2008 for U.S. Appl. No. 11/428,443. (8 pages).
Office Action dated Jun. 10, 2009 for U.S. Appl. No. 11/674,256. (12 pages).
Office Action dated Jun. 29, 2009 for U.S. Appl. No. 11/428,441. (19 pages).

* cited by examiner

210

| | PROGRAM IDENTIFIER 416 | PROGRAM DESCRIPTION 418 | GENRE 420 |
|---|---|---|---|
| 402 | P001 | "THE CARTOON FAMILY" | COMEDY |
| 404 | P002 | "EXECUTIVE DECISIONS" | DRAMA |
| 406 | P003 | "LIFE IN THE CITY" | DOCUMENTARY |
| 408 | P004 | "WORLD SERIES BASEBALL" | SPORTS |
| 410 | P005 | "COOKING WITH ERIC" | EDUCATIONAL |
| 412 | P006 | "MY WACKY ROOMMATE" | COMEDY |
| 414 | P007 | "TRIVIA CHALLENGE" | GAME SHOW |

FIG. 4

212a

| PROGRAM IDENTIFIER: P006 510 | | | | |
|---|---|---|---|---|
| 508 | | | | |
| | EPISODE IDENTIFIER 512 | EPISODE DESCRIPTION 514 | EPISODE CONTENT 516 | RUNNING TIME 518 |
| 502 | EP S1 E1 | "SERIES PREMIERE" | [P_006_EPS1E1.MPG2] | 00:22:15 |
| 504 | EP S1 E2 | "HERE COMES TROUBLE" | [P_006_EPS1E2.AVI] | 00:22:05 |
| 506 | EP S1 E3 | "A NIGHT ON THE TOWN" | [P_006_EPS1E3.MOV] | 00:22:10 |

FIG. 5

214a

620

| EPISODE IDENTIFIER: EP S1 E1 622 | | | | |
|---|---|---|---|---|
| | TRIGGER IDENTIFIER 624 | TRIGGER CONDITION 626 | TRIGGER TYPE 628 | TRIGGER STATUS 630 |
| 602 | TR 001 | ANY LAUGH TRACK | PERSISTENT | ACTIVE |
| 604 | TR 002 | ANY TRACK CHANGE | PERSISTENT | ACTIVE |
| 606 | TR 003 | MAIN CHARACTER SPEAKS | PERSISTENT | ACTIVE |
| 608 | TR 004 | SUPPORTING CHARACTER ENTERS SCENE | PERSISTENT | INACTIVE |
| 610 | TR 005 | TIME CODE = 00:00:23 | SINGLE-USE | USED |
| 612 | TR 006 | TIME CODE: 00:00:49 | SINGLE-USE | USED |
| 614 | TR 007 | TIME CODE: 00:01:03 | SINGLE-USE | USED |
| 616 | TR 008 | TIME CODE: 00:001:27 | SINGLE-USE | NOT USED |
| 618 | TR 009 | TIME CODE: 00:001:43 | SINGLE-USE | NOT USED |

FIG. 6

216

| | RANDOM NUMBER (RANGE) 738 | GAME RESULT 740 |
|---|---|---|
| 702 → | 1-8570 | NONWINNING COMBINATION |
| 704 → | 8571-9250 | CHERRY/ANY/ANY |
| 706 → | 9251-9930 | ANY/ANY/CHERRY |
| 708 → | 9931-10130 | CHERRY/CHERRY/ANY |
| 710 → | 10131-10330 | ANY/CHERRY/CHERRY |
| 712 → | 10331-10398 | CHERRY/ANY/CHERRY |
| 714 → | 10399-10418 | CHERRY/CHERRY/CHERRY |
| 716 → | 10419-10460 | BAR/ORANGE/ORANGE |
| 718 → | 10461-10466 | ORANGE/ORANGE/BAR |
| 720 → | 10467-10508 | ORANGE/ORANGE/ORANGE |
| 722 → | 10509-10528 | BAR/PLUM/PLUM |
| 724 → | 10529-10533 | PLUM/PLUM/BAR |
| 726 → | 10534-10583 | PLUM/PLUM/PLUM |
| 728 → | 10584-10587 | BAR/BELL/BELL |
| 730 → | 10588-10607 | BELL/BELL/BAR |
| 732 → | 10608-10627 | BELL/BELL/BELL |
| 734 → | 10628-10647 | BAR/BAR/BAR |
| 736 → | 10648 | 7/7/7 |

FIG. 7

218

| | RANDOM NUMBER (RANGE) 838 | GAME RESULT 840 | PAYOUT 842 |
|---|---|---|---|
| 802 → | 1-8570 | NONWINNING COMBINATION | 0 |
| 804 → | 8571-9250 | CHERRY/ANY/ANY | 2 |
| 806 → | 9251-9930 | ANY/ANY/CHERRY | 2 |
| 808 → | 9931-10130 | CHERRY/CHERRY/ANY | 5 |
| 810 → | 10131-10330 | ANY/CHERRY/CHERRY | 5 |
| 812 → | 10331-10398 | CHERRY/ANY/CHERRY | 5 |
| 814 → | 10399-10418 | CHERRY/CHERRY/CHERRY | 20 |
| 816 → | 10419-10460 | BAR/ORANGE/ORANGE | 10 |
| 818 → | 10461-10466 | ORANGE/ORANGE/BAR | 10 |
| 820 → | 10467-10508 | ORANGE/ORANGE/ORANGE | 20 |
| 822 → | 10509-10528 | BAR/PLUM/PLUM | 14 |
| 824 → | 10529-10533 | PLUM/PLUM/BAR | 14 |
| 826 → | 10534-10583 | PLUM/PLUM/PLUM | 20 |
| 828 → | 10584-10587 | BAR/BELL/BELL | 18 |
| 830 → | 10588-10607 | BELL/BELL/BAR | 18 |
| 832 → | 10608-10627 | BELL/BELL/BELL | 20 |
| 834 → | 10628-10647 | BAR/BAR/BAR | 50 |
| 836 → | 10648 | 7/7/7 | 100 |

FIG. 8

METHODS AND APPARATUS FOR EMPLOYING AUDIO/VIDEO PROGRAMMING TO INITIATE GAME PLAY AT A GAMING DEVICE

The present application claims the benefit of and priority to U.S. Provisional Patent Application Ser. No. 60/373,112, filed Apr. 16, 2002, and titled "Gaming Device Methods and Apparatus Employing Automatic Game Initiation", which is hereby incorporated by reference herein in its entirety.

BACKGROUND OF THE INVENTION

Within the casino/gaming industry, slot machines typically generate most of the profits realized by casino owners and operators. For this reason, numerous slot machine types and formats have been developed and are employed within casinos (e.g., slot machines having a variety of display formats for the reels of the slot machines, larger jackpots, etc.). By providing a large variety of slot machines, casino owners and operators may appeal to a larger audience, and acquire and retain slot machine players.

Despite a variety of available options, conventional slot machines may still lack sufficient entertainment value to attract and retain slot machine players. Specifically, many people view all or a portion of slot machine play primarily as a passive, relatively boring experience. Accordingly, a need exists for improved slot machines that provide a more interactive and/or exciting gaming experience.

SUMMARY OF THE INVENTION

In a first aspect of the invention, a first method of operating a gaming device is provided. The first method includes the steps of (1) receiving an indication of an occurrence of a game initiation trigger associated with audio/video programming being provided to a player of the gaming device; and (2) in response to the occurrence of the game initiation trigger, initiating game play at the gaming device. The audio/video programming may comprise, for example, a television show, a movie, an animated show, a live event, or the like.

In a second aspect of the invention, a second method of operating a gaming device is provided. The second method is similar to the first method, but includes the step of receiving a selection of audio/video programming for a player of the gaming device. That is, the player of the gaming device may select the audio/video programming to be provided to the player.

In a third aspect of the invention, a method of controlling a gaming device is provided. The method includes the steps of (1) receiving a selection of audio/video programming for a player of the gaming device; (2) providing the selected audio/video programming to the player; (3) detecting an occurrence of a game initiation trigger associated with the selected audio/video programming while the selected audio/video programming is being provided to the player; and (4) in response to the occurrence of the game initiation trigger, initiating game play at the gaming device. One or more of the above methods may be performed, for example, by a controller and/or a gaming device.

Numerous other aspects of the invention are provided, as are systems, apparatus, computer program products and/or data structures in accordance with these and other aspects of the invention. Each computer program product described herein may be carried by a medium readable by a computer (e.g., a carrier wave signal, a floppy disc, a hard drive, a random access memory, etc.).

In another aspect of the invention, a gaming device control system is provided. The gaming device control system includes means for providing a plurality of audio/video programming selections to a player of the gaming device, and means for receiving a selection of audio/video programming by the player. The gaming device control system further includes means for determining at least one game initiation trigger associated with the selected audio/video programming, and means for displaying the selected audio/video programming to the player.

The gaming device control system also includes means for detecting an occurrence of the at least one game initiation trigger while the selected audio/video programming is being displayed to the player, and means for initiating game play at the gaming device in response to the detection of the occurrence of the at least one game initiation trigger. Finally, the gaming device control system includes (1) means for determining an outcome of the game play; (2) means for determining if the outcome is a winning outcome; and (3) means for at least arranging for payment of an outcome amount to the player if the outcome is a winning outcome.

With these and other advantages and features of the invention that will become hereinafter apparent, the nature of the invention may be more clearly understood by reference to the following detailed description of the invention, to the appended claims and to the several drawings attached herein.

BRIEF DESCRIPTION OF THE DRAWINGS

FIG. 4 illustrates a sample of the contents of a programming database of FIG. 2 or 3.

FIG. 5 illustrates a sample of the contents of an episode database of FIG. 2 or 3.

FIG. 6 illustrates a sample of the contents of a game initiation trigger database of FIG. 2 or 3.

FIG. 7 illustrates a sample of the contents of a probability database of FIG. 2 or 3.

FIG. 8 illustrates a sample of the contents of a payout database of FIG. 2 or 3.

DETAILED DESCRIPTION

Figure 1:
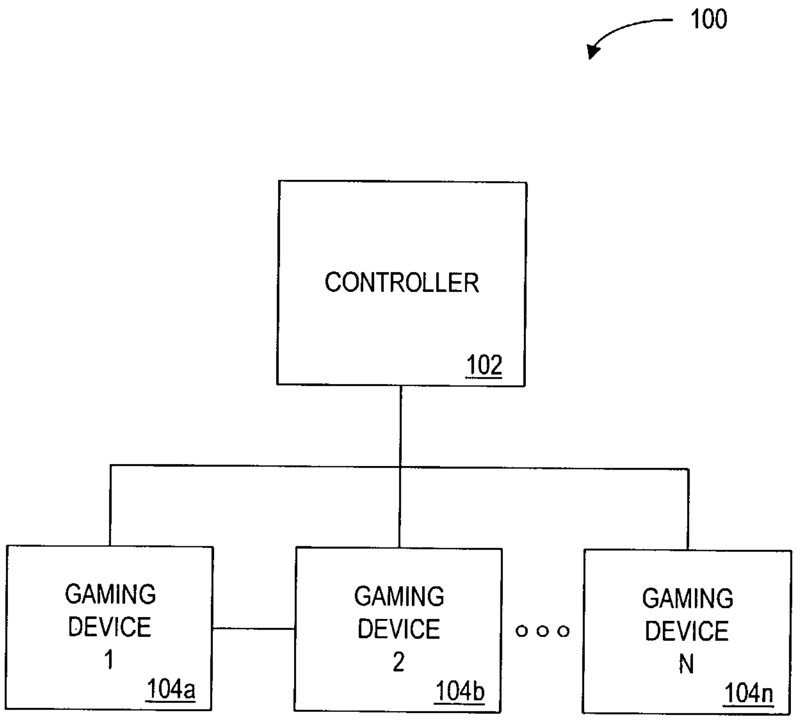
FIG. 1 is a schematic diagram of an exemplary gaming device control system provided in accordance with the present invention.

In one or more embodiments of the invention, audio/video programming may be provided to a player of a gaming device such as a slot machine or video poker game, and game play at the gaming device may be initiated (e.g., automatically) while the audio/video programming is being provided to the player. For example, game play may be initiated automatically in response to the occurrence of one or more game initiation triggers associated with the audio/video programming.

The audio/video programming may comprise, for example, a television show, a movie, an animated show (e.g., a cartoon or animated motion picture), a live event, etc. Each game initiation trigger may comprise a detectable characteristic of the audio/video programming such as a time trigger (e.g., an elapsed time), an audio trigger such as a laugh track or a line spoken by a character, a visual trigger such as a character entering a scene, a prop being displayed, a type of prop being displayed or a scene being displayed, etc. Other exemplary game initiation triggers may include a track change or a "tag" that has been added to the audio/video programming (e.g., computer program code adapted to initiate game play at a gaming device).

By providing audio/video programming to a player of a gaming device, and by automatically initiating game play in response to the occurrence of one or more game initiation triggers while the audio/video programming is being provided to the player, numerous advantages are realized. When contrasted with conventional game play, such a gaming experience tends to be more exciting, interactive, and in some cases more spontaneous (e.g., when the player is unaware of when game play will be initiated during the audio/video programming). Further, automatically initiated game play may be attractive to physically challenged gaming device players, such as arthritic, handicapped and/or elderly players, that find conventional slot machine or similar game play too demanding (e.g., due the requirements of having to pull a handle repeatedly). Accordingly, gaming devices that operate in accordance with the present invention may increase player satisfaction, attract a larger pool of gaming device players and increase the amount of time and/or money people are willing to spend at a gaming device. Casino profitability thereby may increase.

These and other aspects of the inventions are described further below with reference to FIGS. 1-9B.

Relevant Terminology

As used herein, a "gaming device" refers to a slot machine, a video poker machine, a keno machine, a bingo machine or the like. "Audio/video programming" refers to one or more of a television show, a movie, an animated show (e.g., a cartoon or animated motion picture), a live event, etc. An "audio/video program" refers to a single episode of audio/video programming, a portion of an episode of audio/video programming, or a plurality of episodes of audio/video programming (e.g., a television program such as "Friends" includes numerous episodes).

A "game initiation trigger associated with audio/video programming" refers to a game initiation trigger that (1) is related to, depends on and/or is otherwise based on audio/video programming; and (2) may be employed to initiate (e.g., automatically) game play at a gaming device. A "game initiation trigger associated with audio/video programming" does not include a trigger that is based on an outcome of game play at a gaming device, such as reel position.

Exemplary Embodiments of Gaming Device Control System

FIG. 1 is a schematic diagram of an exemplary gaming device control system 100 provided in accordance with the present invention. The gaming device control system 100 includes a controller 102 in communication with a plurality of gaming devices 104*a-n*. Although three gaming devices 104*a-n* are shown in FIG. 1, it will be understood that fewer or more than three gaming devices may be in communication with the controller 102. Further, the controller 102 may comprise one or more controllers. Exemplary embodiments of the controller 102 are described below with reference to FIG. 2.

The gaming devices 104*a-n* may include slot machines, video poker machines, a combination thereof, etc. Other suitable gaming devices also may be employed. Exemplary embodiments of the gaming devices 104*a-n* are described below with reference to FIG. 3.

The gaming devices 104*a-n* may be in communication with the controller 102 via any conventional communications medium and/or protocol. For example, the gaming devices 104*a-n* may communicate with the controller 102 via a WEB-based connection, a local area network (LAN), a wide area network (WAN), the Internet, other forms of internet protocol (IP) networks (e.g., intranets or extranets), a publicly switched telephone network (PSTN), a wireless communications network or any other known communications system/medium. Those skilled in the art will understand that devices in communication with each other need only be "capable of" communicating with each other and need not be continually transmitting data to or receiving data from each other. On the contrary, such devices need only transmit data to or receive data from each other as necessary, and may actually refrain from exchanging data most of the time. For example, a device in communication with another device via the Internet may not transmit data to the other device or receive data from the other device for weeks at a time. Further, devices may be in communication even though steps may be required to establish a communication link (e.g., dialing a network service provider).

As will be described further below, in one or more embodiments of the invention, the controller 102 may be adapted to receive audio/video programming (e.g., from a casino owner or operator or other controller operator), and provide the audio/video programming to one or more of the gaming devices 104*a-n*. During provision of the audio/video programming, the controller 102 may initiate game play at one or more of the gaming devices 104*a-n* in response to the occurrence of one or more game initiation triggers associated with the audio/video programming. For example, the controller 102 may monitor the audio/video programming and/or initiate game play at one or more of the gaming devices 104*a-n* at a predetermined run time of the audio/video programming, in response to a laugh track or a line spoken by a character, as a character enters a scene, as a scene, a prop or a type of prop is displayed, or in response to the occurrence of any other game initiation trigger.

In other embodiments of the invention, all or a portion of the functions performed by the controller 102 may be performed by the gaming devices 104*a-n*. For example, each game device 104*a-n* may store audio/video programming, and game initiation triggers associated with the audio/video programming, locally. In one particular embodiment, all or a part of audio/video programming may be stored in a local memory (e.g., in a suitable format such as MPEG2 as described below) of a gaming device. Such audio/video programming may be provided, for example, from an optical or magnetic storage media and periodically updated as required.

Whether stored locally or provided from a remote location, each gaming device 104*a-n* may be adapted to output audio/video programming to a player of the respective gaming device 104*a-n* and initiate game play at the respective gaming device 104*a-n* in response to the occurrence of one or more game initiation triggers associated with the audio/video programming (e.g., by monitoring the audio/video programming to detect the occurrence of the one or more game initiation triggers).

Exemplary Embodiments of the Controller

Figure 2:
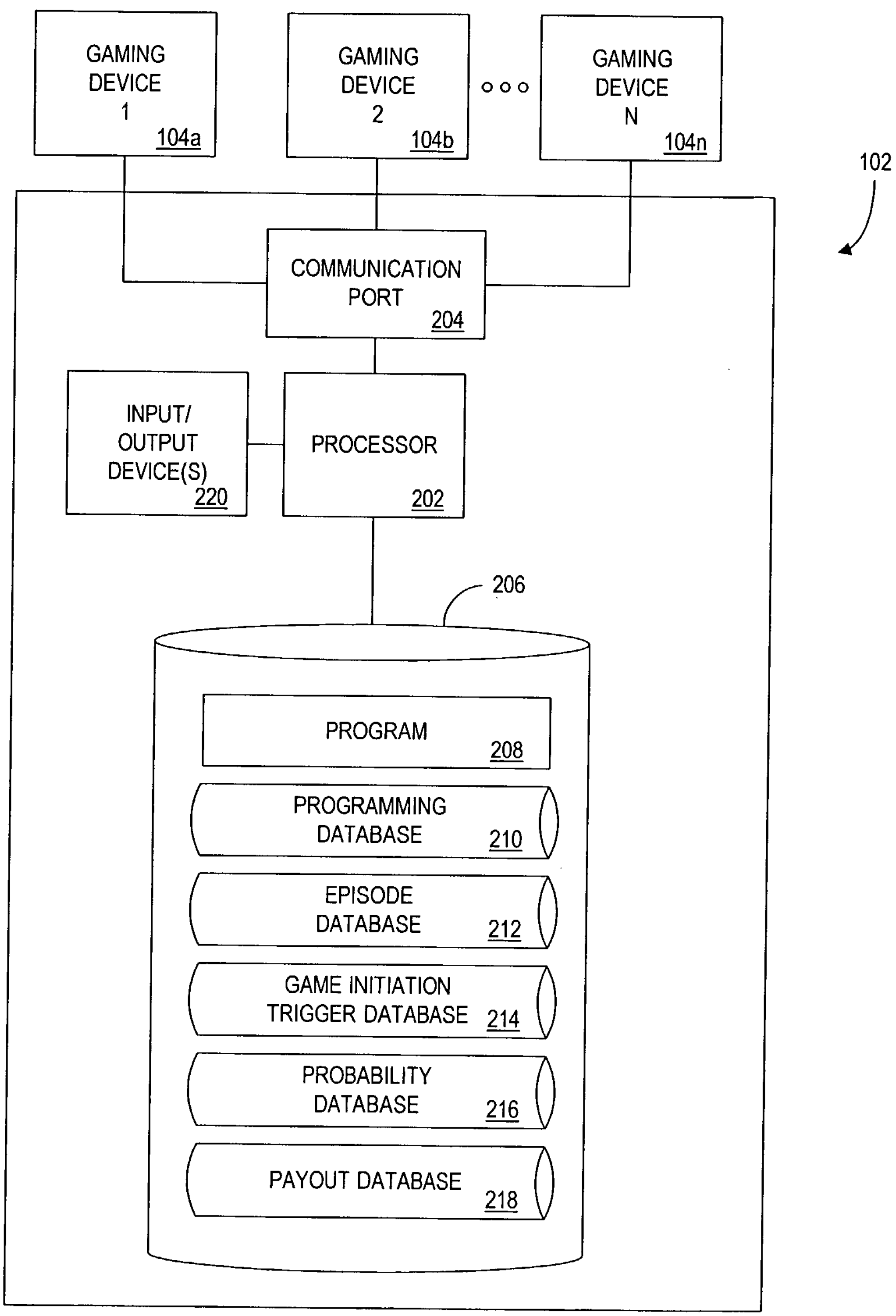
FIG. 2 is a schematic diagram of an exemplary embodiment of a controller of FIG. 1.

FIG. 2 is a schematic diagram of an exemplary embodiment of the controller 102 of FIG. 1 (shown in communication with gaming devices 104*a-n*). The controller 102 may be implemented as a system controller, as a dedicated hardware circuit, as an appropriately programmed general purpose computer, or as any other equivalent electronic, mechanical or electro-mechanical device.

With reference to FIG. 2, the controller 102 comprises a processor 202, such as one or more conventional microprocessors (e.g., one or more Intel® Pentium® processors). The processor 202 is in communication with a communication port 204 through which the processor 202 communicates with other devices (e.g., with the gaming devices 104*a-n* or with other gaming devices not shown). The communication port 204 may include multiple communication channels for simultaneous communication with, for example, the gaming devices 104*a-n* and/or other gaming devices (not shown). As stated, devices in communication with each other need not be continually transmitting to each other. On the contrary, such devices need only transmit to each other as necessary, may actually refrain from exchanging data most of the time, and may require several steps to be performed to establish a communication link between the devices.

The processor 202 also is in communication with a data storage device 206. The data storage device 206 may comprise an appropriate combination of magnetic, optical and/or semiconductor memory, and may include, for example, Random Access Memory (RAM), Read-Only Memory (ROM), a compact disc and/or a hard disk. The processor 202 and the data storage device 206 each may be, for example, located entirely within a single computer or other computing device; or connected to each other by a communication medium, such as a serial port cable, a telephone line or a radio frequency transceiver. Alternatively, the controller 102 may comprise one or more computers that are connected to a remote server computer (not shown) for maintaining databases.

The data storage device 206 may store, for example, (i) a program 208 (e.g., computer program code and/or a computer program product) adapted to direct the processor 202 in accordance with the present invention, and particularly in accordance with the processes described in detail hereinafter; (ii) a programming database 210 adapted to store audio/video programming information that identifies and/or describes types of audio/video programming that may be provided to a player of one or more of the gaming devices 104*a-n*; (iii) an episode database 212 adapted to store information regarding specific episodes of audio/video programming that may be provided to a player of one or more of the gaming devices 104*a-n*; (iv) a game initiation trigger database 214 adapted to store information regarding one or more game initiation triggers associated with episodes of audio/video programming; (v) a probability database 216 adapted to store information that may be used to establish frequencies with which various random number and/or outcome values will occur at one or more of the gaming devices 104*a-n*; and (vi) a payout database 218 adapted to store information that may be utilized to determine a game result (e.g., a slot machine reel position) and an associated payout for one or more of the gaming devices 104*a-n*. Exemplary embodiments of the databases 210-218 are described below with reference to FIGS. 4-8.

The program 208 may be stored, for example, in a compressed, an uncompiled and/or an encrypted format, and may include computer program code that allows the controller 102 to employ the communication port 204 to:

1. receive a selection of audio/video programming from a player of one of the gaming devices 104*a-n;*
2. provide the selected audio/video programming to the player;
3. detect the occurrence of one or more game initiation triggers associated with the selected audio/video programming while the selected audio/video programming is being provided to the player; and/or
4. in response to the occurrence of the one or more game initiation triggers, initiate game play at a gaming device.

Suitable computer program code may be provided for performing numerous other functions such as receiving audio/video programming, determining game initiation triggers for audio/video programming, receiving payment in exchange for game play and/or the provision of audio/video programming, determining audio/video programming and/or a number of games to be initiated during the provision of audio/video programming based on an amount paid by a player, determining a result of game play (e.g., whether a player wins a prize), providing a payout if a player wins, etc. The computer program code required to implement the above functions (and the other functions described herein) can be developed by a person of ordinary skill in the art, and is not described in detail herein.

The controller 102 may include any peripheral devices (e.g., microphones, speakers, a keyboard, a computer display, a touch screen, voice recognition software, an optical or magnetic read head, etc., generally represented by input/output devices 220 in FIG. 2) required to implement the above functionality. The program 208 also may include program elements such as an operating system, a database management system and "device drivers" that allow the processor 202 to interface with computer peripheral devices (e.g., a video display, a keyboard, a computer mouse, etc.).

Note that instructions of the program 208 may be read into a main memory (not shown) of the processor 202 from a computer-readable medium other than the data storage device 206, such as from a ROM or from a RAM. While execution of sequences of instructions in the program 208 causes the processor 202 to perform the process steps described herein, hard-wired circuitry may be used in place of, or in combination with, software instructions for implementation of the processes of the present invention. Thus, embodiments of the present invention are not limited to any specific combination of hardware and software.

The processor 202 also may be in communication with a clock (not shown) that supplies time and date information to the processor 202 and that may comprise, for example, a clock internal to the processor 202, a clock external to the processor 202 or a clock embodied within the program 208 (e.g., based on a system clock not shown).

Exemplary Embodiments of the Gaming Devices

Figure 3:
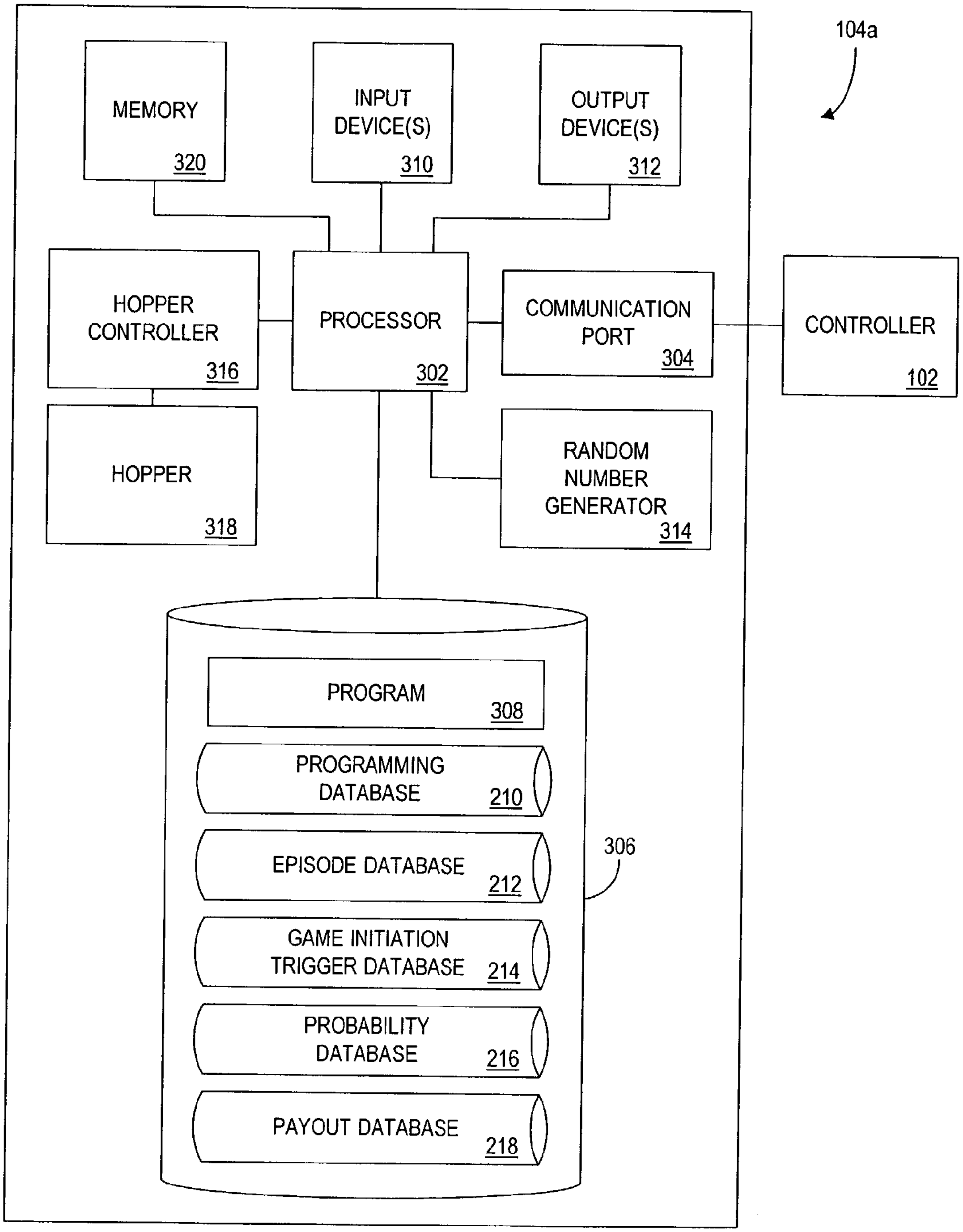
FIG. 3 is a schematic diagram of an exemplary embodiment of a gaming device of FIG. 1.

FIG. 3 is a schematic diagram of an exemplary embodiment of the gaming device 104*a* of FIG. 1 (shown in communication with the controller 102). The gaming devices 104*b-n* may be similarly configured. As stated, each gaming device 104*a-n* may comprise a slot machine, a video poker machine or a similar device modified in accordance with the present invention.

With reference to FIG. 3, the gaming device 104*a* comprises a processor 302, such as one or more conventional microprocessors (e.g., one or more Intel® Pentium® processors). The processor 302 is in communication with a communication port 304 through which the processor 302 communicates with other devices (e.g., with the controller 102 or with other devices not shown). The communication port 304 may include multiple communication channels for simultaneous communication with multiple devices. As stated, devices in communication with each other need not be continually transmitting to each other. On the contrary, such devices need only transmit to each other as necessary, may actually refrain from exchanging data most of the time, and may require several steps to be performed to establish a communication link between the devices.

The processor 302 also is in communication with a data storage device 306. The data storage device 306 may comprise an appropriate combination of magnetic, optical and/or semiconductor memory, and may include, for example, Random Access Memory (RAM), Read-Only Memory (ROM), a compact disc and/or a hard disk. The processor 302 and the data storage device 306 each may be, for example, located entirely within a single computer or other computing device; or connected to each other by a communication medium, such as a serial port cable, a telephone line or a radio frequency transceiver. Alternatively, the gaming device 104*a* may comprise one or more computers that are connected to a remote server computer (not shown) for maintaining databases.

The data storage device 306 may store, for example, a program 308 (e.g., computer program code and/or a computer program product) adapted to direct the processor 302 in accordance with the present invention, and particularly in accordance with the processes described in detail hereinafter with regard to the gaming devices 104*a-n*. In one or more embodiments wherein all or part of the functionality of the controller 102 (FIG. 2) is implemented by the gaming device 104*a*, the gaming device 104*a* may include one or more databases similar to the databases 210-218 described previously with reference to FIG. 2. For convenience, the same reference numerals for these databases are employed in FIGS. 2 and 3. Specifically, the data storage device 306 may store (ii) the programming database 210 adapted to store audio/video programming information that identifies and/or describes types of audio/video programming that may be provided to a player the gaming device 104*a*; (iii) the episode database 212 adapted to store information regarding specific episodes of audio/video programming that may be provided to a player of the gaming device 104*a*; (iv) the game initiation trigger database 214 adapted to store information regarding one or more game initiation triggers associated with episodes of audio/video programming; (v) the probability database 216 adapted to store information that may be used to establish frequencies with which various random number and/or outcome values will occur at the gaming device 104*a*; and (vi) the payout database 218 adapted to store information that may be utilized to determine a game result (e.g., a slot machine reel position) and an associated payout for the gaming device 104*a*. One or more of the databases 210-218 may be eliminated if the corresponding functionality is provided by the controller 102. Exemplary embodiments of the databases 210-218 are described below with reference to FIGS. 4-8.

The program 308 may be stored, for example, in a compressed, an uncompiled and/or an encrypted format, and may include computer program code that allows the gaming device 104*a* to:

1. receive a selection of audio/video programming from a player of the gaming device 104*a;*
2. provide the selected audio/video programming to the player;
3. detect the occurrence of one or more game initiation triggers associated with the selected audio/video programming while the selected audio/video programming is being provided to the player; and/or
4. in response to the occurrence of the one or more game initiation triggers, initiate game play at the gaming device 104*a*.

Suitable computer program code may be provided for performing numerous other functions such as receiving audio/video programming, determining game initiation triggers for audio/video programming, receiving payment in exchange for game play and/or the provision of audio/video programming, determining audio/video programming and/or a number of games to be initiated during the provision of audio/video programming based on an amount paid by a player, determining a result of game play (e.g., whether a player wins a prize), providing a payout if a player wins, etc.

The computer program code required to implement the above functions (and the other functions described herein) can be developed by a person of ordinary skill in the art, and is not described in detail herein. The program 308 also may include program elements such as an operating system, a database management system and "device drivers" that allow the processor 302 to interface with computer peripheral devices (e.g., a video display, a keyboard, a computer mouse, etc.).

Note that instructions of the program 308 may be read into a main memory (not shown) of the processor 302 from a computer-readable medium other than the data storage device 306, such as from a ROM or from a RAM. While execution of sequences of instructions in the program 308 causes the processor 302 to perform the process steps described herein, hard-wired circuitry may be used in place of, or in combination with, software instructions for implementation of the processes of the present invention. Thus, embodiments of the present invention are not limited to any specific combination of hardware and software.

The processor 302 also may be in communication with a clock (not shown) that supplies time and date information to the processor 302 and that may comprise, for example, a clock internal to the processor 302, a clock external to the processor 302 or a clock embodied within the program 308 (e.g., based on a system clock not shown).

The gaming device 104*a* may include any additional components required to implement the above functionality. For example, the gaming device 104*a* may include one or more input devices 310 such as a microphone, a touch screen, a keyboard or keypad, voice recognition software/hardware, an optical or magnetic read head, a card reader, a coin accepter and/or a paper currency validator, a bar code reader (e.g., for discerning value from "cashless" gaming vouchers), a game play initiator such as a button or handle, a biometric device for determining an identity or age of a player, a credit or debit card authorization terminal, etc.

The gaming device 104*a* also may include one or more output devices 312 for outputting appropriate audio/video programming and game play results to a player of the gaming device 104*a*. For example, the gaming device 104*a* may comprise one or more speakers, a cathode ray tube or flat panel display, a projector, a physical or electronic representation of slot machine reels or a poker hand, etc. (Note that the controller 102 may include similar input or output devices.)

In one or more embodiments of the invention, the gaming device 104*a* also may include a random or pseudo-random number generator 314 that may be utilized by the gaming device 104*a* and/or the controller 102 for determining a game result (e.g., after game play has been initiated at the gaming device 104*a* in response to the occurrence of a game initiation trigger). The random number generator 314 also may be employed to determine a corresponding payout to be provided to a player of the gaming device 104*a* as described further below. The random number generator 314 may be embodied in hardware, software or a combination thereof as is known in the art, and may include one or more features that prevent or identify tampering.

To assist in payouts as a result of winning game results at the gaming device 104*a*, the gaming device 104*a* may include a hopper controller 316 and a hopper 318. The hopper controller 316 may be configured to instruct the hopper 318 when to dispense payment, and how much payment to dispense, to a player as a result of a winning game result at the gaming device 104*a*. Hoppers and hopper controllers are well known in the casino gaming device arts and will not be described in further detail herein.

In one or more embodiments of the invention, an additional memory or data storage unit 320 may be provided, for example, to serve as an intermediate storage location for audio/video programming being provided to the gaming device 104*a* from a remote source (e.g., the controller 102 or another location). As stated, the gaming devices 104*b-n* may be configured similarly to the gaming device 104*a* of FIG. 3.

Exemplary Databases for the Controller and/or Gaming Devices

Samples of the contents of the programming database 210, the episode database 212, the game initiation trigger database 214, the probability database 216 and the payout database 218 are shown in FIGS. 4-8, respectively. The specific data and fields illustrated in these figures represent only one embodiment of the records that may be stored in the databases of the invention. The data and fields of these databases, as well as the number of databases, can be readily modified, for example, to include more or fewer data fields. A single database also may be employed. Note that in the databases of the controller 102 and/or the gaming devices 104*a-n*, a different reference numeral is employed to identify each field of each database. However, in at least one embodiment of the invention, fields that are similarly named (e.g., program identification fields, episode identification fields, etc., described below) store similar or the same data in a similar or same data format.

FIG. 4 illustrates a sample of the contents of the programming database 210 of FIG. 2 or 3. As shown in FIG. 4, the programming database 210 contains information related to seven exemplary programming choices available to a player of one of the gaming devices 104*a-n*. Though only seven choices are illustrated in FIG. 4, those skilled in the art will recognize that any number of records or entries may be included in the programming database 210. The seven programming choices are identified in records 402-414, respectively. Specifically, the programming database 210 contains records having fields corresponding to, for example, (1) a program identifier (ID) 416; (2) a program description 418; and (3) a program genre 420. Such fields will be referred to as a program identifier field, a program description field and a program genre field, respectively. Other program information also may be stored in the programming database 210.

The program identifier field of each record 402-414 may store data (e.g., a program identifier 416) representing a unique identifier (e.g., a numeric, alpha-numeric or other code) for audio/video programming that may be provided to a player of any of the gaming devices 104*a-n*. Further, as will be described below, the controller 102 and/or one or more of the gaming devices 104*a-n* may use program identifiers 416 to access audio/video programming to be provided to a gaming device player, and to determine a general category or type of audio/video programming to be provided to the gaming device player.

The program description field of a record 402-414 may store a generalized textual, graphical or other description (e.g., a program description 418) for programming identified by a respective program identifier 416 of the record, such as a name or other explanation of the programming. The program genre field of a record 402-414 similarly may store general classification or genre information (e.g., a program genre 420) for programming identified by a respective program identifier 416 of the record. For example, each program genre field may identify whether programming is a comedy, a drama, a documentary, sports-related, educational, a game show, etc. As described below, by storing program genre information, the controller 102 and/or the gaming devices 104*a-n* may provide gaming device players with increased flexibility, information and/or assistance during programming selection (e.g., so that gaming device players receive the exact programming they wish to receive).

Note that the programming database 210 (and the episode database 212, the game initiation trigger database 214, the probability database 216 and the payout database 218) may be populated with data provided to the controller 102 and/or one or more of the gaming devices 104*a-n* by an operator, owner or manufacturer of the controller 102 and/or the gaming devices 104*a-n*, or by any other relevant party. Such data population may occur, for example, via the communication port 204 of the controller 102 or via the communication port 304 of a gaming device 104*a-n*.

With reference to the programming database 210 of FIG. 4, the record 402 illustrates exemplary data for a program P001 (program identifier 416) named "The Cartoon Family" (program description 418) that is a comedy (program genre 420).

FIG. 5 illustrates a sample of the contents of the episode database 212 of FIG. 2 or 3. More specifically, FIG. 5 illustrates exemplary contents of an entry or table 212*a* of the episode database 212 that contains episode information relating to the sixth program P006 of the record 412 of the programming database 210 of FIG. 4. Similar entries or tables may be provided for the programs P001-P005 and P007 of records 402-410 and 414, respectively, of the programming database 210 of FIG. 4.

As shown in FIG. 5, the entry/table 212*a* of the programming database 210 contains information related to three exemplary episodes of programming available to a player of a gaming device. Though only three episodes are illustrated in FIG. 5, those skilled in the art will recognize that any number of records or entries may be included in the episode database 212. The three episodes are identified in records 502-506, respectively, and represent viewable episodes of the sixth program P006 (as identified by record 508 in FIG. 5). Specifically, the entry/table 212*a* of the episode database 212 contains records having fields corresponding to, for example, (1) a program identifier 510; (2) an episode identifier 512; (3) an episode description 514; (4) episode content 516; and (5) running time 518. Such fields will be referred to as a program identifier field, an episode identifier field, an episode description field, an episode content field and a running time field, respectively. Other episode information also may be stored in the episode database 212.

The program identifier field of the record 508 may store data (e.g., a program identifier 510) representing a unique identifier (e.g., a numeric, alpha-numeric or other code) for audio/video programming that may be provided to a player of any of the gaming devices 104*a-n*. In one or more embodiments of the invention, the information stored in the program identifier field of the record 508 may correspond to (e.g., be the same as) information stored in the program identifier field of one of the records 402-414 of the programming database 210 of FIG. 4.

The episode identifier field of each record 502-506 may store data (e.g., an episode identifier 512) representing a unique identifier (e.g., a numeric, alpha-numeric or other code) for an episode of audio/video programming (identified by the program identifier 510) that may be provided to a player of any of the gaming devices 104*a-n*. As described further below, the controller 102 and/or one or more of the gaming devices 104*a-n* may use the episode identifiers 512 to access one or more episodes of audio/video programming to be provided to a gaming device player.

The episode description field of each record 502-506 may store a generalized textual, graphical or other description (e.g., an episode description 514) of an episode of programming identified by a respective episode identifier 512 of the record, such as a name or other explanation of the episode. In one or more embodiments of the invention, the controller 102 and/or one or more of the gaming devices 104*a-n* may employ information stored within episode description fields of the episode database 212 to assist a player of a gaming device during the selection of audio/video programming (e.g., by providing the player a description of each episode of programming that may be provided to the player during game play). In one particular embodiment, the information stored within the episode description fields of the episode database 212 may be employed to create a menu of programming options from which a player may select a specific episode of programming (e.g., via a gaming device 104*a-n*, the controller 102 or another means).

The episode content field of each record 502-506 may store data (e.g., episode content 516) that may be used by the controller 102 and/or one or more of the gaming devices 104*a-n* to provide an episode of audio/video programming to a gaming device player. For example, the episode content field of one or more of the records 502-506 may store an executable audio/video programming file such as an MPEG2, MPEG, AVI, MOV, WAV or other similar file as is known in the art. Alternatively, the episode content field of one or more of the records 502-506 may include a pointer to remotely stored audio/video programming. For example, if the episode database 212 is located within one of the gaming devices 104*a-n*, an episode content field may contain a pointer to an audio/video programming file stored within the controller 102 or at another of the gaming devices 104*a-n*. Further, an episode content field may contain a pointer to an audio/video programming file stored at any other location (e.g., in a file stored at a world wide web address or other location).

The running time field of each record 502-506 may store data (e.g., running time 518) indicative of a running time of an episode of audio/video programming identified by a respective episode identifier 512 of the record. Such information may be used for a number of purposes. For example, running time information may be employed by the controller 102, one or more of the gaming devices 104*a-n*, an owner or operator of a casino, etc., to determine a total number of game initiation triggers to associate with an episode of audio/video programming. In this manner an owner or operator of a gaming device may ensure that at least a minimum number of game initiation triggers are associated with each episode of audio/video programming that may be displayed at the gaming device. Additionally, in certain embodiments of the invention, running time information may be provided to a player of a gaming device, with or without episode description information, to assist a player with audio/video programming selection (e.g., as a player may have a limited amount of time for game play, wish to view multiple audio/video programs, etc.).

As stated, the episode database 212 may be populated with data provided to the controller 102 and/or one or more of the gaming devices 104*a-n* by an operator, owner or manufacturer of the controller 102 and/or gaming devices 104*a-n*, or by any other relevant party. Such data population may occur, for example, via the communication port 204 of the controller 102 or via the communication port 304 of a gaming device 104*a-n*.

With reference to the entry/table 212*a* of the episode database 212 of FIG. 5, the record 502 illustrates exemplary data for an episode EP S1 E1 (episode identifier 512) of a program P006 (program identifier 510). The episode EP S1 E1 is named "SERIES PREMIERE" (episode description 514), is stored as an MPEG2 file (e.g., within the data storage device 206 of the controller 102 or within the data storage device 306 of one or more of the gaming devices 104*a-n*, as identified by episode content 516), and has a running time of 22 minutes and 15 seconds (running time 518).

FIG. 6 illustrates a sample of the contents of the game initiation trigger database 214 of FIG. 2 or 3. More specifically, FIG. 6 illustrates exemplary contents of an entry or table 214*a* of the game initiation trigger database 214 that contains game initiation trigger information relating to the first episode EP S1 E1 of the episode database 212 of FIG. 5 (which corresponds to an episode of the program P006 of the programming database 210 of FIG. 4). Similar entries or tables may be provided for episodes EP S1 E2 and EP S1 E3 of the program P006 (FIG. 5) as well as for any episodes of the programs P001-P005 and P007 of the programming database 210 of FIG. 4.

As shown in FIG. 6, the entry/table 214*a* of the game initiation trigger database 214 contains information relating to nine game initiation triggers that may be used or otherwise associated with the episode EP S1 E1 of audio/video program P006 (FIG. 5). Though only though only nine game initiation triggers are illustrated in FIG. 6, those skilled in the art will recognize that any number of records or entries may be included in the game initiation trigger database 214. The nine game initiation triggers are identified in records 602-618, respectively. Specifically, the entry/table 214*a* of the game initiation trigger database 214 contains records having fields corresponding to, for example, (1) an episode identifier 622; (2) a trigger identifier 624; (3) a trigger condition 626; (3) a trigger type 628; and (4) a trigger status 630 (e.g., an indication of whether the trigger is to be used). Such fields will be referred to as an episode identifier field, a trigger identifier field, a trigger condition field, a trigger type field and a trigger status field, respectively. Other trigger information also may be stored in the game initiation trigger database 214.

The episode identifier field of record 620 may store data (e.g., an episode identifier 622) representing a unique identifier (e.g., a numeric, alpha-numeric or other code) for an episode of audio/video programming that may be provided to a player of any of the gaming devices 104*a-n*. In one or more embodiments of the invention, the information stored in the episode identifier field of the record 620 may correspond to information stored in the episode identifier field of one of the records 502-506 of the entry/table 212*a* of the episode database 212 of FIG. 5, or of a record of another entry/table (not shown) of the episode database 212.

The trigger identifier field of each record 602-618 may store data (e.g., a trigger identifier 624) representing a unique identifier (e.g., a numeric, alpha-numeric or other code) for a game initiation trigger associated with an episode of audio/video programming (identified by the episode identifier 622) that may be provided to a player of any of the gaming devices 104*a-n*. As described further below, the controller 102 and/or a gaming device 104*a-n* may use a trigger identifier 512 to access a trigger condition of a game initiation trigger, which in turn may be employed to initiate game play at the gaming device 104*a-n*.

The trigger condition field of each record 602-618 may store conditions under which game play may be initiated (e.g., automatically) at one or more of the gaming devices 104*a-n* (e.g., during the provision of the episode of audio/video programming identified by the episode identifier 622). Suitable trigger conditions may comprise the occurrence of detectable characteristics of an episode of audio/video programming such as a time trigger (e.g., an elapsed time, a predetermined time in the total running time of the episode or some other time-dependent factor or time code that may or may not be associated with content of the episode), an audio trigger such as a laugh track or a line spoken by a character, a visual trigger such as a character entering a scene, a prop being displayed, a type of prop being displayed or a scene being displayed, or other programming contexts or features. Other exemplary trigger conditions may include the occurrence of a track change or a "tag" that has been added to audio/video programming (e.g., computer program code adapted to initiate game play at a gaming device).

In one or more embodiments of the invention, an episode of audio/video programming may be reviewed (e.g., by a casino owner or operator, some other relevant party, the controller 102, a gaming device 104*a-n*, etc.), and as a result of the review, one or more trigger conditions may be determined and/or deemed suitable to the episode of programming. The one or more trigger conditions thereafter may be assigned to and/or associated with the episode in the form of one or more game initiation triggers (e.g., by appropriately populating an entry/table of the game initiation trigger database 214 such as the entry/table 214*a*). Occurrence of the trigger conditions/game initiation triggers during provision of the episode of programming then may be used to initiate game play at a gaming device 104*a-n* as described further below.

The trigger type field of each record 602-618 may store "classification" data (e.g., a trigger type 516) for a respective game initiation trigger, and may be used, for example, to determine how often and/or how many times a game initiation trigger should be employed during an episode of audio/video programming. In the example of FIG. 6, game initiation triggers may be either "PERSISTENT" or "SINGLE-USE". A "persistent" game initiation trigger designation may correspond to a game initiation trigger that may be utilized repeatedly during an episode of programming. That is, game play at a gaming device may be initiated each time the trigger condition associated with the respective game initiation trigger is satisfied. Exemplary persistent game initiation triggers include a laugh track, a track change, speech by a main character, entry of a character into a scene, etc. Other persistent game initiation triggers may be employed. In at least one embodiment of the invention, audio/video programming may be tagged or include processor-executable instructions that allow game play at a gaming device to be initiated in response to the occurrence of a persistent-type game initiation trigger.

A "single-use" game initiation trigger designation may correspond to a game initiation trigger that may be utilized only once during an episode of programming to initiate game play at a gaming device. Exemplary single-use game initiation triggers include time codes (e.g., an elapsed time or any other time less than or equal to the running time of the programming), a character's first line or some other similar event, etc. Other types of game initiation triggers may be employed (e.g., periodic, random, player selectable, etc.).

The trigger status field of each record 602-618 may store data (e.g., a trigger status 630) that indicates a status of a game initiation trigger identified by a respective trigger identifier 624. For example, a trigger status field may indicate whether a game initiation trigger is to be used to initiate game play during the provision of an episode of audio/video programming to a player of a gaming device. In one embodiment of the invention, a single-use game initiation trigger may initially have a trigger status of NOT USED (indicating that the trigger is to be subsequently used during the provision of the respective episode of programming to a gaming device player). However, following an occurrence of the single-use game initiation trigger, the status of the game initiation trigger may be changed to USED (indicating that the trigger is not to be subsequently employed during the episode of programming). The controller 102 and/or a gaming device 104*a-n* may perform such a status-change operation.

In another embodiment of the invention, a player of a gaming device may select how many and/or which game initiation triggers should be employed during an episode of programming. In such an embodiment, the player may control the status of game initiation triggers and the controller 102 and/or a gaming device 104*a-n* may determine a payment amount required by the player to have the selected number and/or type of game initiation triggers employed during game play.

The game initiation trigger database 214 may be populated with data provided to the controller 102 and/or one or more of the gaming devices 104*a-n* by an operator, owner or manufacturer of the controller 102 and/or the gaming devices 104*a-n*, or by any other relevant party. Such data population may occur, for example, via the communication port 204 of the controller 102 or via the communication port 304 of a gaming device 104*a-n*.

With reference to the entry/table 214*a* of the game initiation trigger database 214 of FIG. 6, the record 602 illustrates exemplary data for a game initiation trigger TR001 (trigger identifier 624) associated with the episode EP S1 E1 (episode identifier 622) of the program P006 (FIGS. 4 and 5). The trigger condition (trigger condition 626) for the game initiation trigger TR001 is "ANY LAUGH TRACK", and is a persistent game initiation trigger (trigger type 628) that is be used (trigger status 630).

FIG. 7 illustrates a sample of the contents of the probability database 216 of FIG. 2 or 3. As described further below, the probability database 216 contains information that may be utilized by the controller 102 and/or one or more of the gaming devices 104*a-n* to establish frequencies with which various random numbers, game results and/or outcome values occur during game play.

With reference to FIG. 7, the probability database 216 contains frequency information for eighteen number ranges as provided in records 702-736, respectively. Though eighteen ranges of numbers are illustrated in FIG. 7, those skilled in the art will recognize that any number of records or entries may be included in the probability database 216. Specifically, the probability database 216 contains records having fields corresponding to, for example, (1) a random number range 738; and (2) a game result 740. Such fields will be referred to as a random number range field and a game result field, respectively. Other probability information also may be stored in the probability database 216.

The random number range field of each record 702-736 may store data (e.g., a random number range 738) representing a range of numbers (or a number) associated with an a game result (identified by an game result 740 of a respective game result field of the corresponding record). For example, the random number range 1-8570 (e.g., the random number range 738 of record 702) may be associated with a game result of "NONWINNING COMBINATION" (e.g., the game result 740 of record 702). Accordingly, when the random number generator 314 (FIG. 3) of a gaming device 104*a-n* generates a random number in the range of 1-8570, the controller 102 and/or the corresponding gaming device 104*a-n* may associate an outcome value of 0 with the random number. This outcome value, in turn, may be employed by the controller 102 and/or the gaming device 104*a-n* to determine a payout for a gaming device player (as described further below).

In the exemplary embodiment of FIG. 7, the data within the probability database 216 is suitable for use with a three-reel, 22-stop slot machine. Such a slot machine will have 22×22×22=10,648 possible outcomes. To operate in such an embodiment, the random number generator 314 of FIG. 3 may be adapted to generate a random number having a value between 1 and 10,648. In this manner, the random number generator 314 (FIG. 3) will only generate a number that falls within the random number ranges 720 of the probability database 216. It will be understood that other number ranges; outcome values; expected hits per cycle and/or slot machine arrangements (e.g., other numbers of reels and/or stops per reel, virtual reels, etc.) may be employed.

The probability database 216 may be populated with data provided to the controller 102 and/or one or more of the gaming devices 104*a-n* by an operator, owner or manufacturer of the controller 102 and/or gaming devices 104*a-n*, or by any other relevant party. Such data population may occur, for example, via the communication port 204 of the controller 102 or via the communication port 304 of a gaming device 104*a-n*.

FIG. 8 illustrates a sample of the contents of the payout database 218 of FIG. 2 or 3. As described further below, the payout database 218 contains information that may be utilized by the controller 102 and/or a gaming device 104*a-n* to determine a game result and corresponding payout for game play at the gaming device (based on a random number generated by the random number generator 314 of the gaming device). In at least one embodiment of the invention, the game result may include one or more slot reel positions, and the payout may include a number of coins, a payment voucher or the like to be provided to a gaming device player (e.g., based on the game result).

With reference to FIG. 8, the payout database 218 contains game result and payout information for eighteen numbers or number ranges as provided in records 802-836, respectively. Though eighteen ranges of numbers are illustrated in FIG. 8, those skilled in the art will recognize that any number of records or entries may be included in the payout database 218. Specifically, the payout database 218 contains records having fields corresponding to, for example, (1) a random number range 838; (2) a game result 840; and (3) a payout 842. Such fields will be referred to as a random number range field, a game result field and a payout field, respectively. Other game result and/or payout information also may be stored in the payout database 218.

The random number range field of each record 802-836 may store data (e.g., a random number range 838) representing a range of numbers (or a number) associated with a game result (identified by a game result 840) of the record. That is, when a random number is generated by a gaming device 104*a-n* during game play, the controller 102 and/or the gaming device 104*a-n* may determine a game result for the game play by examining data stored within the game result field of the record 802-836 having a random number range 838 that includes the random number. For example, in the exemplary payout database 218 of FIG. 8, the game result "NON-WINNING COMBINATION" (e.g., the game result 840 of record 802) is associated with the random number range 1-8570 (e.g., the random number range 838 of record 802). Accordingly, when the random number generator 314 (FIG. 3) of one of the gaming devices 104*a-n* generates a random number in the range of 1-8570, the controller 102 and/or the corresponding gaming device 104*a-n* may associate a non-winning game result with the random number. This game result, in turn, may be employed by the controller 102 and/or gaming device 104*a-n* to determine a payout (or no payout as the case may be) for a gaming device player (as described further below).

In one or more embodiments of the invention, the information stored in a game result field of a record 802-836 may include reel position information (e.g., for a slot machine embodiment of the invention), a representation of cards to be dealt (e.g., for a video poker machine embodiment of the invention) or any other indicator of game results.

The payout field of a record 802-836 may store data (e.g., a payout 842) that indicates an amount of payment or other reward due to a gaming device player when the corresponding game result 840 of the record is achieved. For example, in the embodiment of FIG. 8, the payout 842 associated with a record 802-836 may represent a number of coins to be output by the hopper 318 (FIG. 3) of a gaming device 104*a-n* when a random number is generated by the gaming device 104*a-n* that falls within a respective random number range 838 of the record. Other payout indicators and/or methods may be employed (e.g., cashless vouchers, game credits, etc.).

The payout database 218 may be populated with data provided to the controller 102 and/or one or more of the gaming devices 104*a-n* by an operator, owner or manufacturer of the controller 102 and/or the gaming devices 104*a-n*, or by any other relevant party. Such data population may occur, for example, via the communication port 204 of the controller 102 or via the communication port 304 of a gaming device 104*a-n*.

Exemplary Operation of the Gaming Device Control System

Figure 9A:
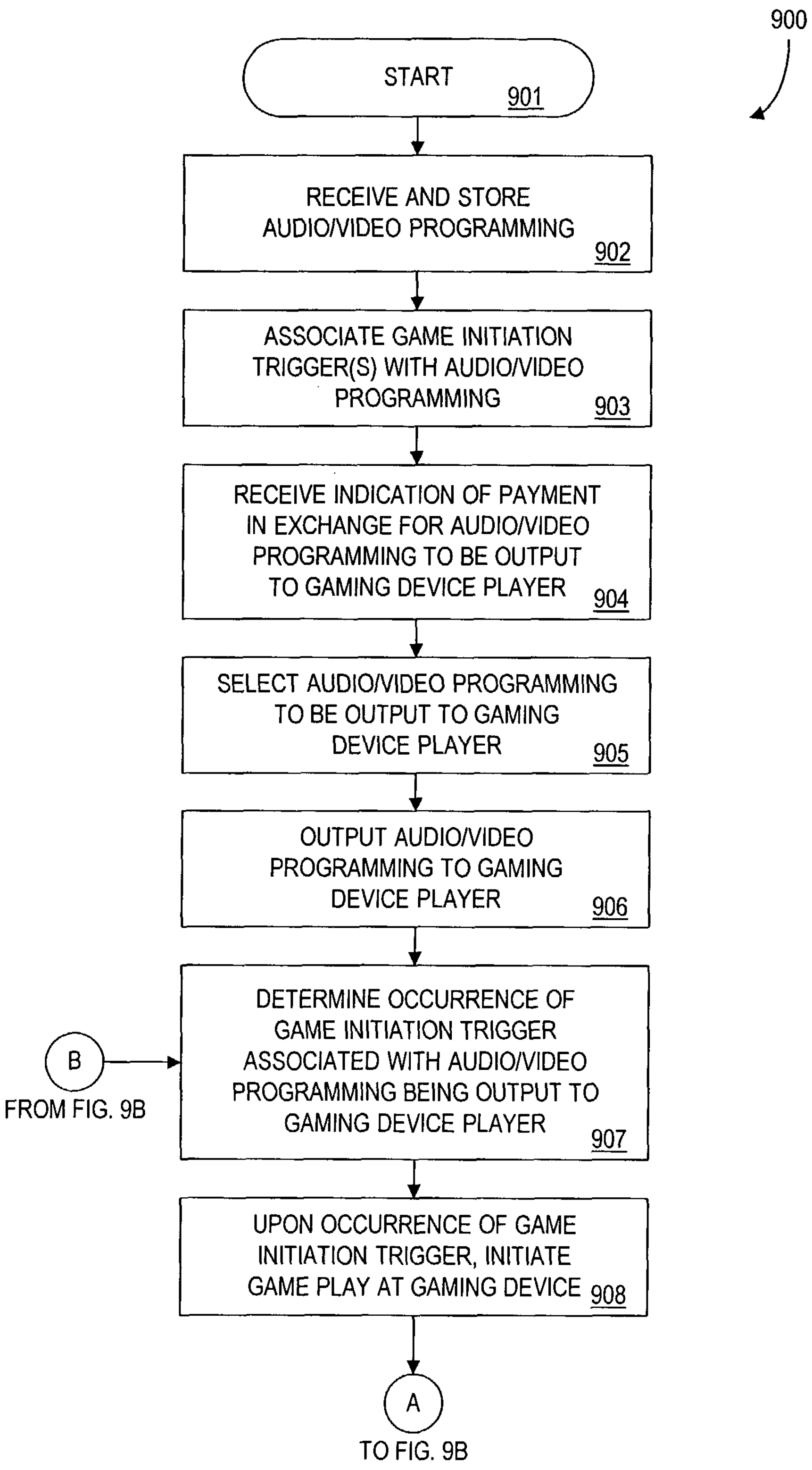
FIGS. 9A-9B illustrate a flow chart of an exemplary process of the gaming device control system of FIGS. 1-8 useful in describing the general operation of the gaming device control system.
Figure 9B:
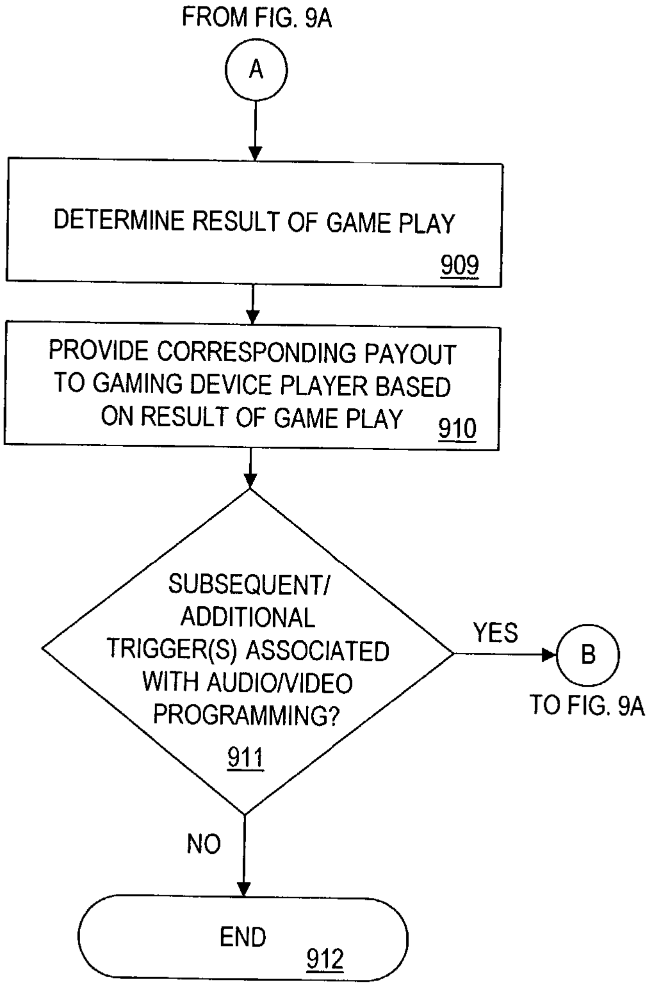

FIGS. 9A-9B illustrate a flow chart of an exemplary process 900 of the gaming device control system 100 of FIGS. 1-8 useful in describing the general operation of the gaming device control system 100. One or more of the steps of the process 900 may be embodied within computer program code of the program 208 of the controller 102 and/or the program 308 of one or more of the gaming devices 104*a-n*. The above-mentioned computer program code may be embodied in one or more computer program products.

With reference to FIG. 9, the process 900 begins in step 901. In step 902, audio/video programming is received by the controller 102 and/or one or more of the gaming devices 104*a-n*. In at least one embodiment of the invention, the audio/video programming may be stored locally at the controller 102 and/or one or more of the gaming devices 104*a-n* (e.g., within the data storage device 206 of the controller 102, the memory 320 or data storage device 306 of a gaming device 104*a-n*, etc.). Alternatively, a pointer to audio/video programming may be received and/or stored by the controller 102 and/or one or more of the gaming devices 104*a-n* (e.g., a WORLD WIDE WEB or other similar address).

Audio/video programming (or pointers to such programming) may be received from a variety of sources. For example, audio/video programming, pointers and/or other information may be provided to the gaming devices 104*a-n* via the controller 102. Further audio/video programming, pointers and/or other information may be provided to the gaming devices 104*a-n* and/or the controller 102 from a source outside of the gaming device control system 100 (e.g., from a casino owner or operator or other third party). In one or more embodiments of the invention, audio/video programming may be provided to the controller 102 and/or one or more of the gaming devices 104*a-n* from a portable media such as a DVD, CD-ROM, etc., from hardware such as a hard disk, dedicated server, set top box (e.g., a TiVo® unit manufactured by Phillips®), etc., from the Internet (e.g., via a download from the World Wide Web), or from any other similar source. Additionally, the controller 102 and/or one or more of the gaming devices 104*a-n* may create audio/video programming (e.g., animated audio/video programming).

In step 903, one or more game initiation triggers are associated with the audio/video programming received by the controller 102 and/or gaming device(s) 104*a-n*. For example, the controller 102 and/or gaming device(s) 104*a-n* may examine the received audio/video programming and determine one or more game initiation trigger that may be associated with the audio/video programming. Likewise, game initiation triggers may be provided with the audio/video programming (e.g., from an outside source such as a casino owner or operator or some other third party). In one or more embodiments of the invention, game initiation triggers are "associated" with audio/video programming by creating and/or storing corresponding trigger conditions within the game initiation trigger database 214 (FIG. 6).

As stated, game initiation triggers (and/or the trigger conditions of such game initiation triggers) may be based on audio/video programming content and may include, for example, a time trigger (e.g., an elapsed time), an audio trigger such as a laugh track or a line spoken by a character, or a visual trigger such as a character entering a scene, a prop being displayed, a type of prop being displayed or a scene being displayed. Other exemplary game initiation triggers may include a track change or a "tag" that has been added to the audio/video programming (e.g., computer program code adapted to initiate game play at a gaming device). As an example, a game initiation trigger for a situational comedy (a "sitcom") may include an appearance of a specific character, a new scene, a line or phrase spoken by a character, a laugh track, etc. In at least one embodiment of the invention, one or more game initiation triggers may be associated with a specific episode, genre, description and/or running time of audio/video programming (e.g., a particular game initiation trigger may be automatically associated with an episode of programming that falls within a particular genre or has a particular running time). Any number of game initiation triggers may be associated with an episode, genre, description and/or running time of audio/video programming.

In step 904, at least an indication of payment is received from a player of one of the gaming devices 104*a-n* in exchange for the provision of audio/video programming to the player. For example, the controller 102 and/or one of the gaming devices 104*a-n* may request/require payment in exchange for the provision of audio/video programming to a gaming device player. In one embodiment of the invention, the controller 102 and/or a gaming device 104*a-n* may associate a predetermined number of game initiation triggers with each episode of audio/video programming that may be provided to a gaming device player. In such instances, payment by a player in exchange for the provision of an episode of audio/video programming to the player may be considered a total wager presented by the player for the total number games that will be initiated at a gaming device via the game initiation triggers associated with the episode of audio/video programming. Accordingly, the controller 102 and/or a gaming device 104*a-n* may establish the payment required for outputting a particular episode of audio/video programming to a gaming device player. Similarly, the payment required for outputting audio/video programming may be based on any game initiation triggers associated with the genre, description and/or running time of the audio/video programming.

In another embodiment of the invention, a player of one of the gaming devices 104*a-n* may determine how many games that the player wishes to have initiated during the provision of audio/video programming, and the controller 102 and/or the respective gaming device 104*a-n* may calculate a payment required for the initiation of the number of games requested by the player during provision of the audio/video programming to the player. The controller 102, the gaming device 104*a-n* or the player may select which game initiation triggers should be employed to initiate game play. In another embodiment of the invention, a gaming device player may merely specify trigger conditions for game play during an episode of audio/video programming, and the controller 102 and/or a gaming device 104*a-n* may examine the episode of programming to determine a number of games that will be initiated based on the selected trigger conditions and a total payment required for initiating the determined number of games.

In step 905, audio/video programming that is to be provided to the gaming device player is selected. For example, the controller 102 and/or a gaming device 104*a-n* may select audio/video programming based on a payment received from a gaming device player (e.g., in step 904). Alternatively, the controller 102 and/or gaming device 104*a-n* may provide a menu or other list of audio/video programming that is available to the player. The menu or list of audio/video programming may or may not depend on the amount of payment received from the player. In one or more embodiments, the menu or list of available audio/video programming may be based on information from the programming database 210 or episode database 212 (e.g., program description, genre, episode description, running time, etc.). For example, a player may be allowed to select a specific episode, genre and/or running time of audio/video programming to receive. Note that in embodiments in which payment from a player is based on the player's selection of audio/video programming, step 905 may occur before step 904.

In step 906, the audio/video programming selected in step 905 is output to a gaming device player. For example, the controller 102 and/or a gaming device 104*a-n* may execute a file containing audio/video programming contained within the episode database 212 of FIG. 5 (e.g., an MPEG2, MPEG, AVI, MOV, WAV or other similar file), and output audio/video content via an appropriate device to the player (e.g., the output device 312 of one of the gaming devices 104*a-n*). Alternatively, the controller 102 and/or a gaming device 104*a-n* may host or output programming received from another source (e.g., a gaming device 104*a-n* may host/output programming received from the controller 102, the controller 102 and/or a gaming device 104*a-n* may host/output programming received from a remote location such as from a dedicated server or the Internet).

In step 907, the audio/video programming being provided to the gaming device player (step 906) is monitored for the occurrence of any game initiation triggers associated with the audio/video programming. For example, based on information stored in the game initiation trigger database 214 (FIG. 6) for the particular episode of programming being provided to the gaming device player, the controller 102 and/or a gaming device 104*a-n* may monitor the episode of audio/video programming to determine if the trigger condition for any "active" game initiation trigger associated with the episode has been met (e.g., whether a certain elapsed time, a laugh track, a character speaking a particular line, a track change, etc., has occurred).

Assuming a game initiation trigger is detected/has occurred, in step 908, the controller 102 and/or a gaming device 104*a-n* may initiate game play at the respective gaming device 104*a-n* (e.g., automatically in response to the occurrence of the game initiation trigger). For example, if game play is to be initiated at a physical reel or video reel slot machine, the controller 102 and/or the respective gaming device 104*a-n* (e.g., via computer program code) may instruct the random number generator 314 of the gaming device to generate a random number. In one or more embodiments of the invention, the controller 102 may initiate game play at a gaming device by transmitting a game initiation signal to the gaming device (e.g., via the communication port 204 of the controller 102). In an alternate embodiment of the invention, a gaming device player may be directed/required to initiate game play at a gaming device upon occurrence of a game initiation trigger. For example, the gaming device and/or the controller may temporarily suspend the presentation of audio/video programming to the player, such as by pausing the audio/video, upon the occurrence of a game initiation trigger. The player may thereafter resume the audio/video programming following the initiation of a game.

In step 909 (FIG. 9B), based on the random number generated by a gaming device 104*a-n* in step 908, the controller 102 and/or the gaming device 104*a-n* determines a result of the initiated game play. For example, the controller 102 and/or the gaming device 104*a-n* may access the game result field of the record 802-836 having a random number range 838 that includes the random number generated in step 908, and determine a game result based on the contents of the game result field of the corresponding record. The game result then may be provided or otherwise displayed to the game player (e.g., as one or more physical or video reels, as a video poker hand, etc.).

In step 910, any payout due to the gaming device player (based on the game result) is provided to the gaming device player. For example, the controller 102 and/or gaming device 104*a-n* may access the payout field of the record 802-836 having a random number range 838 that includes the random number generated in step 908 and/or corresponding to the game result determined in step 909, and determine a payout amount based on the contents of the payout field of the corresponding record. In at least one embodiment of the invention, the controller 102 and/or a gaming device 104*a-n* may direct the hopper 318 (via the corresponding hopper controller 316) to dispense a predetermined payout to the gaming device player. The payout may be cash deposited to a coin tray of a gaming device, posted to an account associated with the gaming device player (e.g., as a credit), a voucher or printed receipt that includes a bar code that may be subsequently validated, etc.

In step 911, the controller 102 and/or the gaming device 104*a-n* determines if any more game initiation triggers are associated with the audio/video programming being provided to the gaming device player. For example, the controller 102 and/or gaming device 104*a-n* may examine the trigger status field of each record of the relevant entry/table of the game initiation trigger database 214 to determine if additional active game initiation triggers are associated with the audio/video programming. If so, the process 900 returns to step 907 to detect the occurrence of subsequent game initiation triggers; otherwise the process 900 ends at step 912.

The foregoing description discloses only exemplary embodiments of the invention. Modifications of the above disclosed apparatus and methods which fall within the scope of the invention will be readily apparent to those of ordinary skill in the art. For instance, in at least one embodiment of the invention, different numbers or types of game initiation triggers may be assigned to different episodes of audio/video programming. As an example, each occurrence of a laugh track may serve as a game initiation trigger for an episode A of an audio/video program, while each appearance of a certain character may serve as a game initiation trigger for an episode B of the audio/video program. In this manner, the number of games to be initiated at a gaming device may vary based on the particular episode of a program being provided to a gaming device player. Multiple entries/tables of game initiation triggers (e.g., one for each unique episode) thereby may be associated with an audio/video program.

In another embodiment of the invention, the audio/video programming to be output to a gaming device player may include a live event (e.g., a sporting event such as a baseball game, basketball game, football game, a concert, etc.). In such an embodiment, a live broadcast may be monitored (e.g., by an operator of the gaming device control system 100), and game play may be manually initiated at one or more gaming devices 104*a-n* based on the occurrence of one or more game initiation triggers. For example, during a baseball game, an appropriate game initiation trigger may be the throwing of a pitch to a batter. An operator may monitor the baseball game and initiate game play at a gaming device 104*a-n* whenever a pitcher throws a pitch to a batter (e.g., while the baseball game is being provided to a player of the gaming device). Game play may be initiated by transmitting a game initiation signal to the controller 102 and/or one or more of the gaming devices 104*a-n*.

In yet another embodiment of the invention, the occurrence of a game initiation trigger may result in the initiation of multiple game plays at a gaming device. For example, a bonus round or game play may be initiated or allowed at a gaming device when a sitcom character speaks a certain line or in response to some other game initiation trigger. Likewise, the occurrence of a game initiation trigger may result in the initiation of partial game play, and/or multiple game initiation triggers may need to occur before game play is initiated at a gaming device. For example, the occurrence of a laugh track during a sitcom may initiate spinning of a single reel of a three-reel slot machine; and three laugh tracks may be required to initiate the spinning of all three reels (and the subsequent determination of a game result).

Exemplary Use of the Gaming Device Control System

A non-limiting description of an exemplary use of the gaming device control system disclosed herein follows.

A slot machine located on the floor of a casino presents a menu of available television sitcoms on the machine's display screen (output device(s) 312). Each sitcom has a listing of available episodes along with brief descriptions of those episodes.

Using a touch screen on the front of the slot machine, the player selects episode EP S1 E1 (entry 506 in programming database 212) of "My Wacky Roommate", his favorite television show. The episode costs $25, and triggers a reel spin (and 25-cent wager) every time the laugh track is used. Although the player is informed that there are 100 laugh tracks associated with this particular episode, he does not know when they will occur during the episode.

The player inserts a $20 bill into the bill validator and touches an "accept" button to begin the show. The slot machine deducts $20 from his credit balance and the episode begins, displayed on display screen (output device(s) 312). Every time the laugh track is heard, the reels of the slot machine spin to reveal an outcome such as "Cherry-Cherry-Bar" and the hopper disburses a payout (or credits are added to the credit meter) if it is a winning outcome (e.g. in accordance with payout database 218). Since the reel spins are performed automatically, the player is free to relax and enjoy the episode as if he were in the comfort of his own home watching television—with the additional occasional benefit of winning slot machine spins to add to the entertainment experience.

In preparation for display at such a slot machine, the episode has been previously reviewed and the running time at which a laugh track occurs has been documented (e.g. as a time code in the trigger condition field 626 of the of the game initiation trigger database 214). Thus, by utilizing a running time to initiate slot machine reel spins, the spins are synchronized to the occurrence of individual laugh tracks occurring within the context of the episode while being presented to the player.

Because the player has prepaid for the entire episode, there is no need to insert coins when the reels are initiated by an occurrence of the laugh track.

Following completion of the episode, the player may elect to cash out all or a portion of his balance or to watch another episode by selecting from the menu provided by the slot machine.

Accordingly, while the present invention has been disclosed in connection with exemplary embodiments thereof, it should be understood that other embodiments may fall within the spirit and scope of the invention as defined by the following claims.

The invention claimed is:

1. A method of operating a gaming device, said gaming device including a plurality of instructions, said method comprising:

(a) prior to initiating a play of a wagering game on the gaming device:

(i) causing at least one display device to display audiovisual programming at the gaming device, content of the audiovisual programming being content produced for a purpose other than for use on gaming devices, (ii) causing a processor to execute the plurality of instructions to monitor content of the audiovisual programming for an occurrence of a wagering game initiation trigger within the content as the audiovisual programming is being displayed, and (iii) causing the processor to execute the plurality of instructions to detect, via the monitoring, the occurrence of the wagering game initiation trigger within the content of the displayed audiovisual programming; and (b) after a detection of the occurrence of the wagering game initiation trigger within the content of the audiovisual programming:

(i) causing the processor to execute the plurality of instructions to initiate the play of the wagering game on the gaming device, (ii) causing the processor to execute the plurality of instructions to randomly determine a wagering game outcome for the initiated play of the wagering game, (iii) causing the at least one display device to display the randomly determined wagering game outcome, (iv) causing the processor to execute the plurality of instructions to determine any award associated with the randomly determined wagering game outcome, and (v) causing the at least one display device to display any determined award.

2. The method of claim 1, wherein the wagering game initiation trigger includes a time code that identifies a time within the audiovisual programming to initiate the play of the wagering game.

3. The method of claim 1, wherein the wagering game initiation trigger includes an audio trigger that occurs within player-perceptible content of the audiovisual programming.

4. The method of claim 1, wherein the wagering game initiation trigger includes a visual trigger that occurs during the display of the audiovisual programming.

5. The method of claim 1, further including generating a random number with a random number generator as part of the play of the wagering game.

6. The method of claim 1, further including providing a plurality of audiovisual programs from which a player may select to have provided to the player; and receiving a selection from the player of one of the plurality of audiovisual programs which determines, at least in part, the audiovisual programming which is displayed to the player.

7. The method of claim 6, further including providing information about running times for each of the plurality of audiovisual programs.

8. The method of claim 1, further including receiving a wager from the player prior to displaying the audiovisual programming.

9. The method of claim 1, further including receiving a selection from a player as to a type of wagering game initiation trigger within the content of the audiovisual programming will initiate the play of the wagering game.

10. A system comprising:

a controller; and a user interface operatively configured to operate with the controller to:

(a) prior to initiating a play of a wagering game:

(i) display audiovisual programming through the user interface, the audiovisual programming including content produced for a purpose other than for use on gaming devices, (ii) monitor content of the audiovisual programming for an occurrence of a wagering game initiation trigger within the content as the audiovisual programming is being displayed, and (iii) detect the occurrence of the wagering game initiation trigger within the content of the audiovisual programming; and (b) after a detection of the wagering game initiation trigger within the content of the audiovisual programming:

(i) initiate the play of the wagering game, (ii) randomly determine a wagering game outcome for the initiated play of the wagering game, (iii) display the randomly determined wagering game outcome, (iv) determine any award associated with the randomly determined wagering game outcome, and (v) display any determined award.

11. A non-transitory computer readable medium comprising software with instructions to:

(a) prior to initiating a play of a wagering game:

(i) cause a display of audiovisual programming at the gaming device, the audiovisual programming including content produced for a purpose other than for use on gaming devices, (ii) monitor content of the audiovisual programming for an occurrence of a wagering game initiation trigger within the content as the audiovisual programming is being provided, and (iii) detect, via the monitoring, occurrence of the wagering game initiation trigger within the content of the audiovisual programming; and (b) after a detection of the game initiation trigger within the content of the audiovisual programming:

(i) initiate the play of the wagering game, (ii) randomly determine a wagering game outcome for the initiated play of the wagering game, (iii) cause a display of the randomly determined wagering game outcome, (iv) determine any award associated with the randomly determined wagering game outcome, and (v) cause a display of any determined award.

12. The method of claim 3, wherein the audio trigger includes an occurrence of a laugh track within the audiovisual programming.

13. The method of claim 3, wherein the audio trigger includes an occurrence of a line spoken by a character during the display of the audiovisual programming.

14. The method of claim 4, wherein the visual trigger comprises a character entering a scene during the display of the audiovisual programming.

15. The method of claim 4, wherein the visual trigger includes a type of prop being displayed during the display of the audiovisual programming.

16. A system comprising:

a gaming device;

a display device proximate to the gaming device; and a memory unit associated with the gaming device and configured to operate with the display device, and the gaming device to:

(a) prior to displaying a wagering event to a player, display a portion of audio/video programming to the player, content of the audio/video programming being content produced for a purpose other than for use on the gaming device, and (b) after the display of the portion of the audio/video programming has begun and upon an occurrence of one of a plurality of different wagering event initiation triggering events within the displayed audio/video programming:

(i) initiate the wagering event, (ii) randomly determine an outcome in association with the initiated wagering event, (iii) display the randomly determined outcome, (iv) determine any award associated with the randomly determined outcome, and (v) display any determined award.

17. The system of claim 16, wherein the memory unit is additional to any memory unit of the gaming device.

18. The system of claim 16, wherein the memory unit is positioned remotely from the gaming device and a controller accesses the audio/video programming using a pointer.

19. The system of claim 18, wherein the controller is configured to access a database to retrieve the pointer.

20. The system of claim 16, wherein the memory unit is selected from at least one of a group consisting of: a dvd, a cd-rom, a hard disk, a dedicated server, a set top box, a digital video recorder (DVR), and a web server.

21. The system of claim 16, wherein the audio/video programming is selected from at least one of a group consisting of: a television show, a movie, an animated show, and a live event.

22. The system of claim 16, wherein the wagering event initiation triggering events are selected from at least one of the group consisting of: a laugh track, a character speaking a line, a character using a prop, a character entering a scene, and a scene being displayed.

23. A method of operating a gaming device including a plurality of instructions, said method comprising:

(a) providing audio/video programming in a memory device, wherein the audio/video programming is associated with at least one wagering event initiation triggering event and content of the audio/video programming being content produced for a purpose other than for use on the gaming device;

(b) prior to displaying a wagering event to a player, causing at least one display device of the gaming device to display a portion of the audio/video programming;

(c) causing a processor to execute the plurality of instructions to cause an initiation of the wagering event on the gaming device in response to an occurrence of the at least one wagering event initiation triggering event;

(d) causing the at least one display device to display a randomly determined outcome of the wagering event to the player of the gaming device;

(e) causing the processor to execute the plurality of instructions to determine any award associated with the randomly determined outcome; and (f) causing the at least one display device to display any determined award.

24. The method of claim 23, wherein the memory device is positioned remotely from the gaming device.

25. The method of claim 23, wherein the memory device is selected from at least one of the group consisting of: a dvd, a cd-rom, a hard disk, a dedicated server, a set top box, a digital video recorder (DVR), and a web server.

26. The method of claim 23, wherein the audio/video programming includes at least one selected from the group consisting of: a television show, a movie, an animated show, and a live event.

27. The method of claim 23, further including causing the processor to execute the plurality of instructions to associate the at least one wagering event initiation triggering event with the audio/video programming.

28. A method of operating a gaming system, said method comprising:

(a) prior to displaying a wagering event to a player of a gaming device and after displaying of a portion of audio/video programming to the player of the gaming device, receiving, at a server, an indication of an occurrence of a wagering event initiation trigger associated with the display of the portion of the audio/video programming being displayed to the player of the gaming device, content of the audio/video programming being content produced for a purpose other than for use on the gaming device; and (b) after the occurrence of the wagering event initiation trigger:

(i) causing the server to transmit an instruction to the gaming device to initiate the wagering event, (ii) randomly determining an outcome in association with the initiated wagering event, (iii) causing the gaming device to display the randomly determined outcome, (iv) determining any award associated with the randomly determined outcome, and (v) causing the gaming device to display any determined award.

29. The method of claim 28, further including storing the audio/video programming at the server.

30. The method of claim 29, further including causing the server to transmit the audio/video programming to the gaming device so that the gaming device may display the audio/video programming to the player.

31. The method of claim 28, further including detecting the occurrence of the wagering event initiation trigger.

32. The method of claim 28, further including monitoring for the occurrence of the wagering event initiation trigger.

33. The method of claim 28, wherein the wager event initiation trigger includes a time code that identifies a time during the display of the portion of the audio/video programming to initiate the wagering event.

34. The method of claim 28, wherein the wager event initiation trigger includes an audio trigger that occurs during the display of the portion of the audio/video programming.

35. The method of claim 28, wherein the wager event initiation trigger includes a visual trigger that occurs during the display of the portion of the audio/video programming.

36. The method of claim 28, wherein the wager event initiation trigger includes a track change that occurs during the display of the portion of the audio/video programming.

37. A system comprising:

a gaming device including a user interface; and a server communicatively coupled to the gaming device and including a control system configured to:

(a) prior to initiating a wagering event at the gaming device and after a portion of audio/video programming is displayed to a player of the gaming device, receive an indication of an occurrence of a wagering event initiation trigger associated with audio/video programming being displayed to the player of the gaming device, content of the audio/video programming being content produced for a purpose other than for use on the gaming device; and (b) after the occurrence of the wagering event initiation trigger, transmit an instruction to the gaming device to initiate the wagering event at the gaming device, the initiated wagering event including a random determination of an outcome, a display of the randomly determined outcome, a determination of any award associated with the randomly determined outcome and a display of any determined award.

38. A method of operating a gaming system including a plurality of instructions, said method comprising:

(a) causing a display device to display a portion of audio/video programming prior to providing a wagering event to a player, content of the audio/video programming being content produced for a purpose other than for use on a gaming device;

(b) receiving an indication of an occurrence of a wagering event initiation trigger associated with the portion of the audio/video programming being displayed to the player; and (c) after the occurrence of the wagering event initiation trigger:

(i) causing at least one processor to execute a plurality of instructions to cause an initiation of the wagering event at the gaming device, (ii) causing the at least one processor to execute the plurality of instructions to randomly determine an outcome for the initiated wagering event at the gaming device, (iii) causing the display device to display the randomly determined outcome, (iv) causing the at least one processor to execute the plurality of instructions to determine any award associated with the randomly determined outcome, and (v) causing the display device to display any determined award.

39. A system comprising:

a gaming device including a user interface; and a controller that operates with the gaming device to:

(a) prior to displaying a wagering event to a player, display a portion of audio/video programming to the player of the gaming device via the user interface of the gaming device, content of the audio/video programming being content produced for a purpose other than for use on the gaming device;

(b) receive an indication of an occurrence of a wagering event initiation trigger associated with the audio/video programming being displayed to the player; and (c) after the occurrence of the wagering event initiation trigger, initiate the wagering event at the gaming device, the initiated wagering event including a random determination of an outcome, a display of the randomly determined outcome, a determination of any award associated with the randomly determined outcome and a display of any determined award.

* * * * *